United States Patent [19]

Yoshino et al.

[11] 4,014,509
[45] Mar. 29, 1977

[54] PROPORTIONAL ELECTROMAGNETIC-TYPE DIRECTION- AND THROTTLE-CONTROLLING VALVE

[75] Inventors: Susumu Yoshino; Masaru Kikuchi, both of Fujisawa; Hisakazu Ichioka, Yokohama, all of Japan

[73] Assignee: Yuken Kogyo Company Limited, Fujisawa, Japan

[22] Filed: May 28, 1975

[21] Appl. No.: 581,684

[30] Foreign Application Priority Data

May 31, 1974 Japan .................................. 49-60785

[52] U.S. Cl. .................... 251/26; 137/625.61; 137/625.64; 251/30; 251/31
[51] Int. Cl.² .............. F16K 31/42; F15B 13/043
[58] Field of Search ..... 91/51; 137/625.61, 625.64; 251/26, 30, 31

[56] References Cited

UNITED STATES PATENTS

| 2,949,131 | 8/1960 | Collins | 137/625.64 |
| 2,973,746 | 3/1961 | Jupa | 91/51 X |
| 3,598,152 | 8/1971 | Andrews | 137/625.61 |
| 3,804,120 | 4/1974 | Garnett | 137/625.64 |
| 3,856,047 | 12/1974 | Takayama | 137/625.61 |

FOREIGN PATENTS OR APPLICATIONS

| 1,550,321 | 5/1969 | Germany | 251/30 |
| 23,597 | 10/1968 | Japan | 137/625.64 |

Primary Examiner—Alan Cohan
Assistant Examiner—Gerald A. Michalsky

[57] ABSTRACT

A proportional electromagnetic-type direction-and throttle-controlling valve comprising a spring centered valve spool in a valve body, a pressure reducing valve, two flow restricting orifices, two DC solenoid controlled poppet valves and a vent port in each pressure chamber. Supply flow reduced to a fixed low pressure is divided into two branch lines with flow restricting orifices. The pilot pressure in each restricted flow passage with vent port is controlled by a DC solenoid-controlled poppet valve. The pilot pressure acting on the main spool end moves the spool against the spool centering spring force proportionally to the input DC current. Therefore, the flow rate through the throttling gap between the spool land and the mating valve body is controlled proportionally to input DC current. Vent ports are provided for rapid action of the spool.

4 Claims, 2 Drawing Figures

PROPORTIONAL ELECTROMAGNETIC-TYPE DIRECTION- AND THROTTLE-CONTROLLING VALVE

BACKGROUND OF THE INVENTION

This invention relates to a proportional electromagnetic-type direction-and throttle controlling valve.

Most conventional electromagnetic type flow, direction and pressure controlling valves employ the following devices for controlling the pilot pressure to control the spring centered main spool position.

1. Nozzle flapper type
2. Pilot spool type

In a nozzle flapper type, high supply pressure is directly applied to the flow restricting orifice and the pressure down stream of the orifice is controlled by a nozzle flapper controlling nozzle flow. The pressure drop across the orifice is large compared with that of the present invention. Therefore orifice diameter for nozzle flapper restriction is required to be small which is disadvantageous as regards particulate contaminants in the system fluid.

In a pilot spool type, the pilot spool is apt to stick due to uneven pressure distribution around the spool. This is also caused by particulate contaminants in the system fluid.

The position of the main valve spool controlled by pilot fluid pressure controlled by a pilot spool is apt to drift according to fluctuation of the supplying fluid pressure.

Such proportional controlling valves require special equipment to protect the system from particulate contaminants of the system fluid and a high powered fluid supplying unit to avoid pressure fluctuation.

This equipment is usually cost high and needs careful maintenance.

SUMMARY OF THE INVENTION

It is an object of the invention to provide a proportional electromagnetic-type direction and throttle-controlling valve less effected by particulate contaminants in the system fluid and to protect the control system from the effect of supply fluid pressure fluctuation and to be suitable for industrial application which does not require highly precise controls and maintenance such as for aircraft or missile application.

In the present invention, directional and flow control is effected by proportional positioning of the main valve spool.

Positional control of the main valve spool is made by applying fluid pressure supplied from a pressure reducing valve through a restricting orifice and controlled by a DC solenoid controlled poppet valve.

The pressure reducing valve serves for supplying low fixed pressure to the orifice. Therefore, the pressure drop across the orifice is small compared with other types without a pressure reducing valve. The orifice diameter of the present invention is comparatively large which is advantageous in particulate contaminant control. For supply pressure fluctuation, the application of the pressure reducing valve is advantageous because fixed pressure is always supplied regardless of the supply pressure fluctuation. The application of a solenoid controlled poppet valve is also advantageous for pilot pressure control compared with the pilot spool type because poppet valves are less effected by particulate contaminants. For the emergency stop device of an actuator or rapid motion of the actuator cylinder piston, pilot pressure vent control valves are provided, which vent controlling pilot pressure on one or both sides of the main valve spool when the control valve is operated.

DESCRIPTION OF THE PREFERRED EMBODIMENTS

A preferred embodiment according to this invention will now be described with reference to the accompanying drawings.

Figure 1:
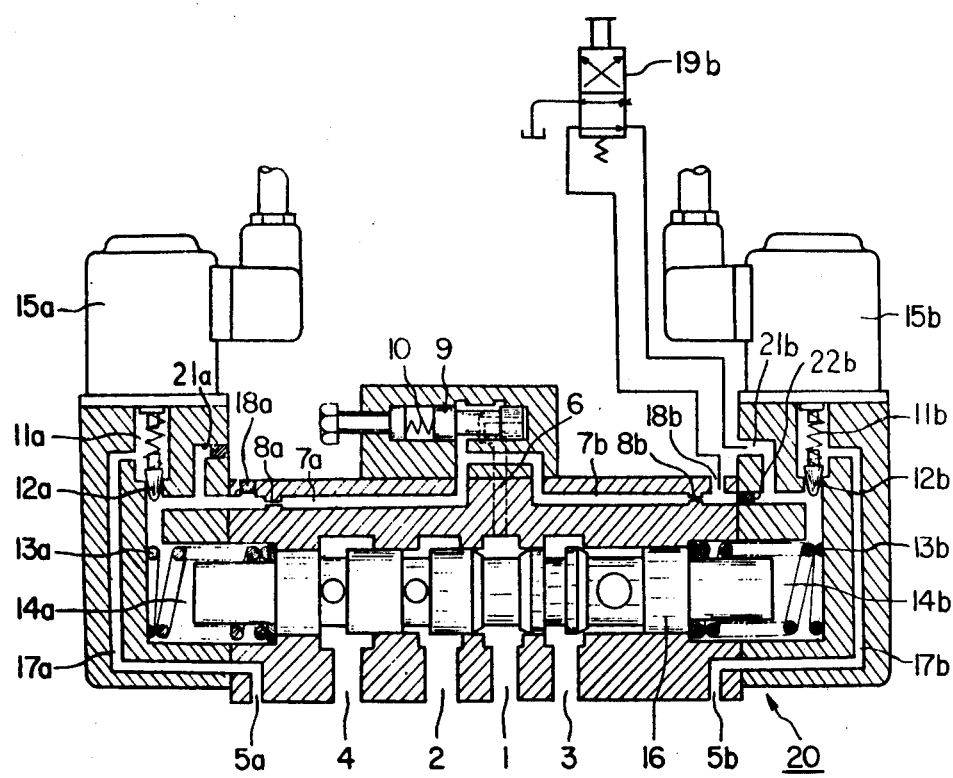
FIG. 1 is a sectional view of a proportional electromagnetic-type direction-and throttle-controlling valve comprising an integrated pressure reducing valve and one pilot pressure vent controlling directional valve provided on one side of the main spool purposely to return quickly the cylinder rod when one side pilot pressure of the spool is vented.

In FIG. 1, there is seen a spool-type direction-and throttle-controlling valve having a valve body 20 with P port 1, A port 2, B port 3 and R port 4. Fluid from A port 2 and B port 3 are connected to R port 4 through a main valve spool 16. In other words, the spool function of this valve in neutrol position is P port blocked type or A B R ports connected type. Spools with other spool functions are also applicable.

Main valve springs 13a and 13b are provided in pressure chambers 14a and 14b at each end of said spool.

Said P port 1 is communicated through a pressure-reducing valve 9 of constant secondary pressure type and further with pilot passages 7a and 7b and restricting orifices 8a and 8b. Said passage 7a and said orifice 8a are connected directly to said pressure chamber 14a. Downstream of said orifice 8b there is connected to pilotpressure vent control valve 19b controlling flow to pressure chamber 14b.

Said pressure chambers 14a and 14b are provided respectively with pilot poppets 12a and 12b actuated by DC solenoids 15a and 15b through springs 11a and 11b.

When one of said solenoids is energized, it forces its poppet valve to the poppet seat with force proportional to the strength of energization, and in case of no energization, the poppet is forced slightly against the seat with initial spring set force. The chambers, in which said poppet springs 11a and 11b are installed, are communicated through pilot drain passages 17a and 17b to drain ports 5a and 5b respectively.

In FIG. 1, reference numerals 18a, 18b and 21a, 21b are vent ports, 22b is a pilot pressure inlet port to the pressure chamber 14b. In this embodiment, said pilot pressure vent control valve 19b is connected to vent port 18b and 21b, while the other vent ports 18a and 21a and port 22b are blocked.

The operation of the proportional electromagnetic-tupe direction-and throttle-controlling valve according to this invention is as follows:

Pressure fluid from P port 1 is branched to a pressure reducing valve 9, and is reduced to a fixed secondary pressure regulated by the pressure regulating spring 10, then divided into two flow passages 7a, 7b with flow restricting orifices 8a, 8b in each and flows respectively to pressure chamber 14a, 14b.

When said solenoids 15a and 15b are not energized, said pressure reduced fluid flows past the poppets 12a and 12b at low pressure determined by the poppet spring force to the drain ports 5a and 5b. Therefore, the main valve spool 16 does not operate and holds its neutral position centered by the main valve springs 13a and 13b.

When one solenoid 15a is energized, the poppet 12a is forced against its valve seat, then the pressure in the pressure chamber 14a rises to move the main valve spool 16 to the right in the drawing to a position where a force balance between the main valve spring 13b and said fluid pressure is established.

Since the displaced distance of the main valve spool 16 is proportional to the magnetic force of the solenoid 15a, it is possible to regulate said spool travel distance by controlling the energizing current to the solenoid 15a. Thus, when the valve according to this invention is connected to an actuator, the supplying flow rate can be varied continuously by moving the main valve spool position. Therefore, actuator motion with smooth starting, stopping or reversing without shock is available by controlling the solenoid current.

FIG. 1 shows an embodiment of venting control in which pilot pressure vent control valve 19b is provided down stream of the restricting orifice 8b.

Figure 2:
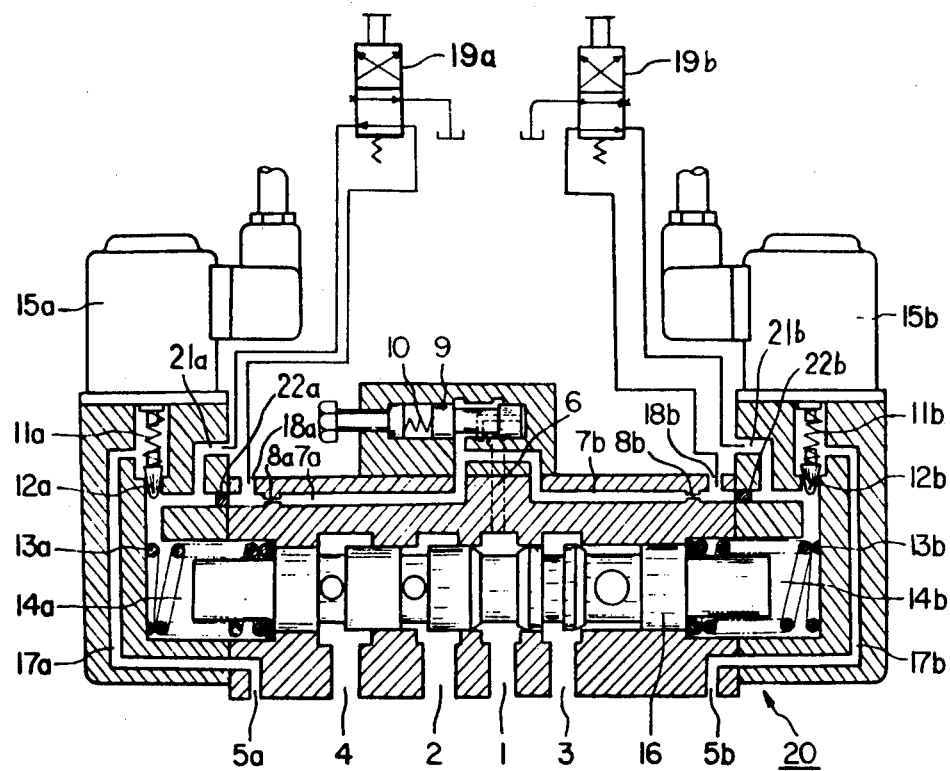
FIG. 2 is also a sectional view of a control valve shown in FIG. 1 with addition of another pilot pressure vent controlling directional valve installed in opposite side of the main spool purposely to stop quickly the actuator motion when both sides pilot pressure of the spool are vented.

In actual application, A port 2 will be connected to the headside of an actuator cylinder and B port 3 will be connected to the rod end side of the cylinder. In the above connection, if the control valve is shifted from spring offset position, the pressure fluid in the pressure chamber 14b will be vented to atmosphere, and the main valve spool will move quickly to the right in the drawing and pressure fluid from P port 1 will flow to B port 3, then return fluid from the cylinder head side will flow from A port 2 to return R port 4 and the cylinder rod will retract at high speed. Furthermore, when two pilot pressure vent controlling valves 19a and 19b are provided respectively to pressure chamber 14a and 14b as shown in FIG. 2, where block means 22a is provided down stream of restricting orifice 8a and upstream of poppet valve 12a, they can be used for an emergency stop of the actuator. In other words, when said directional valves 19a and 19b are operated, the pressure in chambers 14a and 14b will be vented, then the main valve spool 16 will return rapidly to its neutral center position by the centering spring forces, and main flow to the actuator will be shut and motion of the actuator will stop.

Furthermore, though the internal pilot type in which pilot pressure is supplied from same source in the valve body, is shown in the drawings, when a plurality of the proportional electromagnetic-type direction-and throttle valves are used, their pilot pressure can be supplied from one pressure reducing valve provided externally.

As mentioned above, the proportional electromagnetic-type direction-and throttle-controlling valve according to this invention has the advantages that operational troubles due to particulate contaminants in the system fluid and defects due to supplying pressure fluctuation are minimized by employment of the supply pressure reducing valve and poppet type valve to control the pilot pressure, and the small solenoids satisfy the requirements because of low reduced pressure, said valve having good reproducibility with little dispersion because the main valve spool position is determined by the pilot pressure and main spool centering spring force, the actuator speed being varied continuously without shock because the valve spool position is controlled proportionally to the input current.

Therefore, a hydraulic system, for instance, of an injection machine and the like can be simplified by using the valve of the present invention to have smooth and shockless advancing, stopping and returning of the actuator.

Thus, this invention has very high expectations in industrial application.

What we claim is:

1. A proportional electromagnetic type direction and throttle control valve comprising a body with a plurality of ports, a spool slidable in said body for controlling communication between said ports, said body having chambers at opposite ends of said spool, springs in said chambers acting on said spool at the ends thereof, one of said ports being a pilot pressure port, a pressure reducing valve connected to said pilot pressure port, two pilot pressure passages being provided in said body connected to the output of said pilot pressure valve to receive pilot pressure flow therefrom, a flow restricting orifice in each pilot passage, each pilot pressure passage being connected downstream of said orifice with a respective said chamber, a discharge outlet being provided in each said passage between the associated orifice and chamber, a poppet valve for selectively closing each discharge outlet, a further spring acting on each poppet valve to urge the same to closed position and a D-C solenoid acting on each said poppet valve in series with the respective said spring for exerting an additional force on said poppet valve to urge said valve to close said discharge outlet in proportion to the input current to said solenoid.

2. A valve as claimed in claim 1 wherein said pressure reducing valve is integrated with said body.

3. A valve as claimed in claim 1 wherein said pressure reducing valve is external of said body.

4. A valve as claimed in claim 1 comprising a vent control valve connected to at least one of said pilot pressure passages downstream of the respective said orifice and upstream of the respective said poppet valve, whereby restricted fluid normally flows to the associated chamber.

* * * * *